US010761315B2

(12) United States Patent
van Zwet et al.

(10) Patent No.: US 10,761,315 B2
(45) Date of Patent: Sep. 1, 2020

(54) HIGH POWER ADAPTIVE MIRROR

(71) Applicant: Nederlandse Organisatie voor toegepast-natuurwetenschappelijk onderzoek TNO, 's-Gravenhage (NL)

(72) Inventors: Erwin John van Zwet, 's-Gravenhage (NL); Teunis Cornelis van den Dool, 's-Gravenhage (NL); Evert Nieuwkoop, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 143 days.

(21) Appl. No.: 16/062,516

(22) PCT Filed: Dec. 16, 2016

(86) PCT No.: PCT/NL2016/050883
§ 371 (c)(1),
(2) Date: Jun. 14, 2018

(87) PCT Pub. No.: WO2017/105240
PCT Pub. Date: Jun. 22, 2017

(65) Prior Publication Data
US 2019/0004310 A1 Jan. 3, 2019

(30) Foreign Application Priority Data
Dec. 18, 2015 (EP) .................................... 15201382

(51) Int. Cl.
*G02B 26/08* (2006.01)
*G02B 26/06* (2006.01)
(52) U.S. Cl.
CPC ......... *G02B 26/0825* (2013.01); *G02B 26/06* (2013.01); *G02B 26/0841* (2013.01); *G02B 26/0866* (2013.01)

(58) Field of Classification Search
CPC .................................................. G02B 26/0825
(Continued)

(56) References Cited

U.S. PATENT DOCUMENTS

| 2003/0011859 A1* | 1/2003 | Paris .................... B23K 26/046 |
| | | 359/224.1 |
| 2004/0027698 A1 | 2/2004 | Bischof |
| 2010/0078543 A1* | 4/2010 | Winker .................. G02B 26/06 |
| | | 250/201.9 |

OTHER PUBLICATIONS

Mohammad J. Moghimi et al., "Electrostatic-Pneumatic Membrane Mirror with Positive or Negative Variable Optical Power," Journal of Microelectromechanical Systems, vol. 24, No. 3, pp. 716-729 (Jun. 2015).

(Continued)

*Primary Examiner* — James C. Jones
(74) *Attorney, Agent, or Firm* — Leydig, Voit & Mayer, Ltd.

(57) ABSTRACT

According to an aspect of the invention, there is provided a mirror structure for adaptive optics devices, characterized in that it comprises: an elastically deformable layer in response to an applied force, said deformable layer comprising a central portion reflective to said an incident light beam (F); a support substrate positioned spaced with respect to said deformable layer; a spacer element connected to said elastically deformable layer and support substrate and positioned there between, said spacer element being arranged so that the separation distance between said first and second inner surface is in the range between 2 and 100 micron; an inner chamber at least partially defined by said first and substrate and by said spacer element, said inner chamber containing a pressurized gas (G); an actuator system capable of causing a deformation of said central portion counteracting the pressure of said pressurized gas; wherein, in use, said central portion is deformed according to profiles such as to (Continued)

control said light beam. Advantages may include thermal robustness and improved dimensional scaling properties.

9 Claims, 3 Drawing Sheets

(58) Field of Classification Search
USPC .......................................................... 359/298
See application file for complete search history.

(56) References Cited

OTHER PUBLICATIONS

Stefano Bonora et al., "Push-Pull Membrane Mirrors for Adaptive Optics," CNR-INFM, Laboratory for Ultraviolet and X-ray Optical Research Department of Information Engineering, University of Padova via Gradenigo 6/b, 35131 Padova, Italy, Received Jul. 3, 2016; revised Sep. 5, 2006, accepted Sep. 5, 2006, Dec. 11, 22006/vol. 14, No. 25/Optics Express 11935 (10 pages).

V.V. Samarkin et al., "Abstract—Adaptive Optical System with Water-Cooled Bimorph Deformable Mirror," CAOL 2010 International Conference on Advanced Optoelectronics & Lasers, Sep. 10-14, 2010, Sevastopol, Ukraine (1 page).

European Patent Office, International Search Report in corresponding International Application No. PCT/NL2016/050883 dated May 29, 2017 (4 pages).

\* cited by examiner

HIGH POWER ADAPTIVE MIRROR

CROSS-REFERENCE TO RELATED APPLICATIONS

This patent application is a U.S. National Phase of PCT International Application No. PCT/NL2016/050883, filed Dec. 16, 2016, which claims priority to European Application No. 15201382.7, filed Dec. 18, 2015, which are both expressly incorporated by reference in their entireties, including any references contained therein.

FIELD

The present invention relates to the technical field of adaptive optical devices.

BACKGROUND

Several high tech applications depend on light sources and highly sophisticated optical systems for their primary process. For instance, in the semiconductor industry, the new generation lithography tools employ high power lasers for generation of EUV exposure light, while in the space industry high power lasers are used to create laser guide stars. Also in material processing and machining, lasers are applied for local melting, or cutting through raw material.

A driving trend that is shared among the associated application roadmaps is towards increasing power of the light being processed combined with tightening optical requirements.

This poses new technological challenges, since performance of the optical systems is highly dependent on the accuracy and stability of the optical elements in the light processing path. Raising the light source power levels impose increasing threats, e.g. through extreme thermal loading that may lead to deformations of optical surfaces and thus causing optical performance deteriorations such as focus shift which directly impact the primary process and performance.

The most promising solution directions lies in the field of Adaptive Optics (AO), where active control is introduced in the light processing system to preserve or adapt the shape of optical elements, such that optical performance is continuously guaranteed and disturbance influences are being suppressed. Adaptive Optics has proven its merits already in various high performance applications, such as deformable mirrors in astronomy instruments. A challenge that is apparent here is to make adaptive optics also available to high power applications as well.

Likewise, in space industry as well, adequate adaptive optics for high power lasers would be of benefit in creating brighter and more stable guide stars.

In particular, the present invention relates to a deformable reflective structure that can be used in an optical device to dynamically transform the wavefront of a light beam.

However, current deformable reflectors are not capable of handling high power light beams.

One of the other key challenges in the development of a deformable mirror is the small actuator pitch in combination with a large inter-actuator stroke on a continuous face sheet.

A further object of the present invention is to provide a deformable reflective structure that is easily scalable in diameter from several millimetres to tens of centimetres.

A further object of the present invention is to provide a deformable reflective structure that is easy to produce on an industrial scale, at competitive costs.

US2010/078543 shows a pressure environment for a flexible membrane active on both sides. The environment is sealed by a transparent conductor designed to pull up the membrane in order to maintain a flat shape. However this provision necessarily impedes the light transmission to the membrane.

SUMMARY OF THE INVENTION

This aim and these objects, as well as other objects that will be apparent from the description below and from the accompanying drawings, are achieved, according to the invention, by a reflective structure according to claim 1, proposed below.

In particular, there is provided a mirror structure for adaptive optics devices comprising an elastically deformable layer in response to an applied force, said deformable layer comprising a central portion reflective to said an incident light beam (F); a support substrate positioned spaced with respect to said deformable layer; a spacer element connected to said elastically deformable layer and support substrate and positioned there between, said spacer element being arranged to provide a distance between said first and second inner surface; an inner chamber at least partially defined by said first and substrate and by said spacer element, said inner chamber containing a pressurized fluid (G); an actuator system capable of causing a deformation of said central portion counteracting the pressure of said pressurized fluid; wherein, in use, said central portion is deformed according to profiles such as to control said light beam.

In another aspect, the present invention relates to an adaptive optics device comprising the reflective structure according to the invention.

In a further aspect thereof, the present invention relates to an optical system comprising the reflective structure according to the invention.

BRIEF DESCRIPTION OF THE DRAWINGS

Further characteristics and advantages of the reflective structure according to the invention will be more apparent with reference to the description given below and to the accompanying figures, provided purely for explanatory and non-limiting purposes, wherein.

DETAILED DESCRIPTION OF THE DRAWINGS

Figure 1:
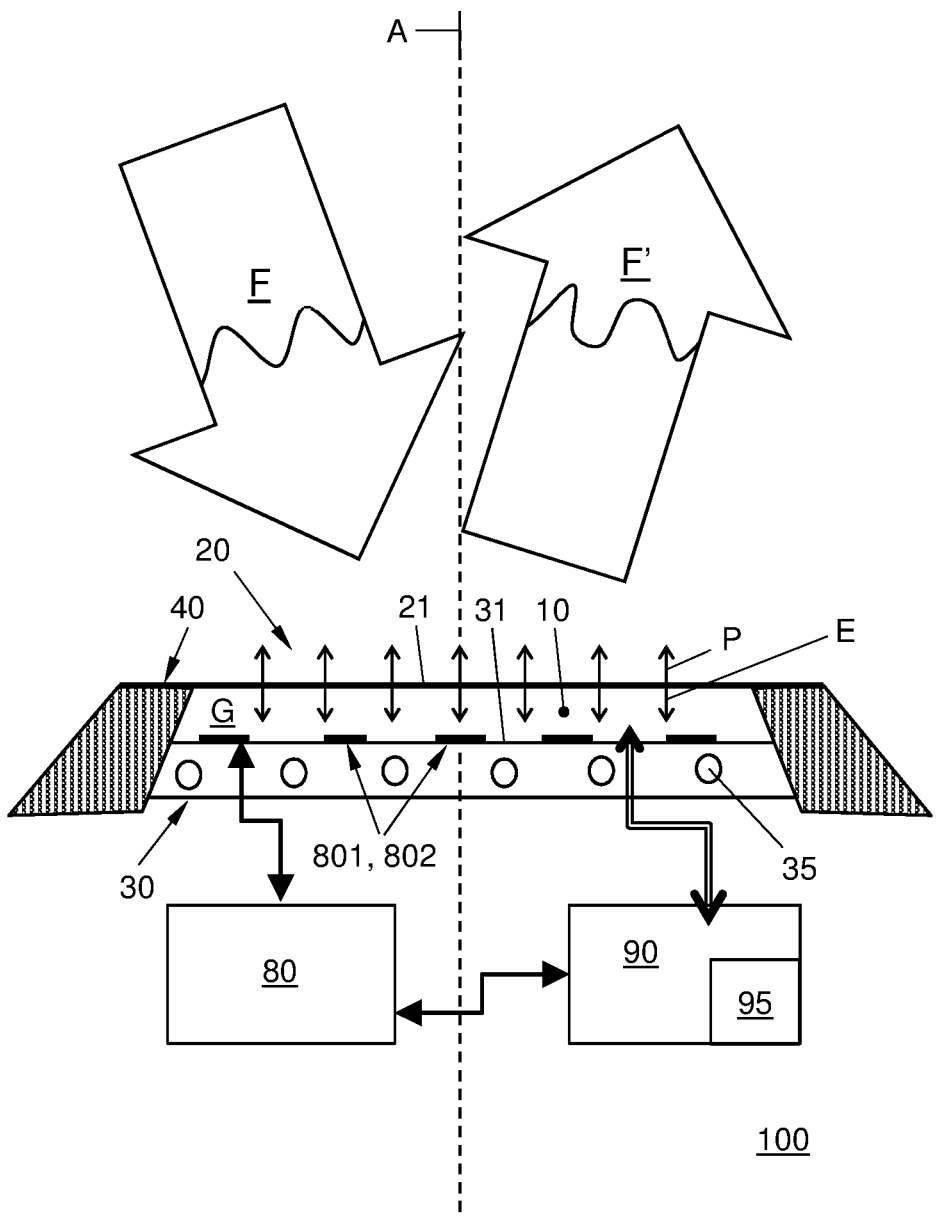
FIG. 1 schematically shows a reflective structure according to the invention in an embodiment thereof.

With reference to the aforesaid figures, the present invention refers to an elastically deformable reflective structure 100 for adaptive optics devices. According to an aspect of the present invention, an inner chamber 10 is at least partially defined by an elastically deformable layer 20; a support substrate 30 positioned spaced with respect to said deformable layer, and by a spacer element 40 connected to said first and substrate. The spacer element 40 being arranged so that the separation distance between said first and second inner surface is in the range between 2 and 100 micron, said inner chamber 10 containing a pressurized thermo-conductive gas. In an embodiment electrostatic actuators are adapted to supply control voltages to generate an electrostatic force, between said deformable layer and support substrate, capable of causing an attractive deformation force E of a central portion of the deformable layer 20 counteracting the pressure force P of said gas. By reducing the electrostatic force, effectively a repellent force is created by the pressurized gas. In an embodiment, the fluid may be a thermos-conductive gas such as Hydrogen, or any other suitable conductive gas, including Nitrogen, Oxygen etc. In another embodiment, the fluid may be a pressurized liquid.

By pressurizing the chamber 10, a nominal flat surface for deformable layer 21 can be provided which is not compatible with a standard electrostatic actuator that only pulls and thereby in use effectively has a slightly concave mirror surface.

Due to the flat surface the gap between the deformable layer and the substrate will be nominally constant over the complete area of the deformable layer. This allows the diameter of the deformable mirror to be scaled from millimeters to tens of centimeters.

The actuator pitch can easily be scaled from centimetres down to less than a millimetre while maintaining a significant inter-actuator stroke, due to the low required pre-tension in the face sheet.

The moving mass of the face sheet can be minimal, enabling a very fast face sheet response.

In an embodiment, the actuator can simultaneously be used for measurement (and internal feedback) of the gap size, resulting in an actuator response free of hysteresis, and drift.

Due to the fluid pressure and the negative spring stiffness of an electrostatic actuator, the position of the deformable layer might become unstable. Therefore a control loop, preferably based on the internal feedback, is required for stabilization. The control bandwidth required for a stable operation can be reduced by increasing the (squeeze film) damping of the gas G. E.g. said substrate and or deformable layer may be provided with gas flow damping structures. By proper selection of the gap size the optimum balance can be found between control bandwidth and the dynamic behaviour of the deformable mirror. With a gap of 15 µm, damping values as high as 50 N·s/m can be achieved, resulting in a reduction of required control bandwidth from above 10 kHz to just several kHz.

The gas pressure in the gap between the substrate and the face sheet is balanced with the electrostatic actuator forces E in order to control the global flatness of the face sheet. Although the embodiment is provided for an electrostatic actuator, the principle could be applied with other actuators as well, e.g. magnetic actuator.

A reflective structure 100 is provided with an optical axis A along which, in the use of the reflective structure 100, an incident light beam with a phase front F is transmitted.

Within the scope of the present invention, the definition "elastically deformable layer" is intended, in the normal operation of the reflective structure 100, as a layer (for example the layer 21) that is capable of returning to its original shape and volume when at rest, after undergoing mechanical deformation in response to an applied force.

The terms "rigid layer" or "rigid element" are intended, in normal operation of the reflective structure 100, as a layer (for example the layer 30) or element (for example the spacer element 40) that does not undergo appreciable mechanical deformations in response to an applied force.

Preferably, the layer 21 has substantially planar geometry and, in conditions at rest, is arranged perpendicularly with respect to the optical axis A.

Preferably, layer 20 is formed by a thin region of material, for example, a metal, a polymer material, a glass, an elastomer material, or the like. In an embodiment, a Silicon nitride and polysilicon based face sheet is used having a pre-tension in the range of 25 N/m to 250 N/m and with maximum pressures of the actuators in the range of 1 to 20 mbar.

Preferably, the layer 20 has a thickness of between 1 micrometer and 20 micrometer. The stiffness of the face sheet is the combination of the bending stiffness of the material itself, that depends strongly on the thickness of the face sheet. And the pre-tension in the face sheet.

The face sheet may be made by an LPCVD process, by deposition on a wafer stack of Si3N4, polysilicon and Si3N4. After deposition of the layers most of the support wafer is etched away. Only an outer rim remains and serves as the support frame of the face sheet. Finally the face sheet may be coated by for example a (low stress) protected gold or protected silver coating that acts as the reflective mirror surface.

Preferably, the spacer element 40 is electrically insulating. According to the invention, the spacer element 40 is arranged (for example by suitable adjusting the thickness thereof) so as to maintain the inner faces of the layers 21-31 at a separation distance between 2 micron and 100 micron. In this way the amount of damping of the gas G can be optimized in order to reduce the required control bandwidth for active stabilisation of the position of the mirror surface 21.

The inner chamber 10 contains a gas G, electrically insulating and having suitable thermal conductivity to provide for thermal conduction of the thermal energy impacting the mirror surface 21 to the substrate 30.

In an embodiment, especially in high power appliances, the substrate 30 may be provided with a cooling structure, e.g. cooling flow circuit/channels 35 filled with a suitable coolant, e.g. a water or a coolant gas.

The use of a gas G in chamber 10 has several significant advantages over the use of a liquid. The mechanical damping of a gas is much lower compared to a liquid, giving a much better match to optimal damping required for the control bandwidth. For the sensing based on capacitive measurements a gas shows virtually no variation in dielectric properties for example as function of temperature. All liquids, on the contrary, show a temperature dependency of the dielectric properties, resulting in measurement errors of the gap size.

According to an aspect, the reflective structure 100 comprises one or more electrostatic actuators 801, 802, operatively associated with the deformable layer and support substrate to control the inter-distance or gap between the layer and support substrate.

In particular, the electrostatic actuators 801, 802 are partly positioned at the central portion 21 of the deformable 20 and partly positioned at corresponding positions on substrate 30.

The electrostatic actuators 801, 802 are adapted to supply respective control voltages, selectively adjustable, with corresponding electrodes (not shown) attached to the face sheet 20 and substrate 30, and that are patterned in known patterning fashion, e.g. in matrix fashion. Accordingly an intensity of the force field E depends, point by point, on the aforesaid respective control voltages.

The force field E between the deformable layers 21 and the substrate 30 causes the onset of an electrostatic pressure thereon. Due to this electrostatic pressure, the layer 21, being elastically deformable, undergoes mechanical deformation, at least at the first central portion 21.

Preferably, the support 30 preferably forms a rigid support for the spacer element 40 and the layer 20. In this case, although subjected to the electrostatic pressure generated by the force field E, it behaves like a rigid body and does not undergo any appreciable mechanical deformation. Likewise, the spacer element 40 behaves like a rigid body and does not undergo any appreciable mechanical deformation due to the aforesaid electrostatic pressure.

Since electrostatic actuators 801, 802 are capable of deforming the elastic mirror layer 20, in particular the first central portion 21 thereof, in a controlled manner, according to a desired profile, in particular a profile suitable for the wavefront adjustment of the light beam F that impacts the reflective structure 100, to result in a modified wave front F'.

By appropriately adjusting said control voltages, central portion 21 of the layer 20 is therefore deformable according to complex profiles, for example according to polynomial functions that describe Zernike surfaces including focus that can now be set to zero, contrary to traditional electrostatic mirrors. This advantage results in more efficient and less complex optical systems, with a greater stroke variability thus providing a large optional range of adaptive optical shaping and without a need for compensating the innate focus of traditional adaptive optics systems. In addition, due to the active pressure control, the driving controllers can be made very energy efficient due to the active pressure control.

In an embodiment said pressurized gas is actively controlled by a pressure controller 90 that is coupled to the actuator controller 80. This allows for compensation e.g. for changes in ambient air pressure. Actuator voltages required to hold the face sheet in the right position can in such an embodiment be used as measurement of the gas pressure in the gap, in particular, to measure a saturation value of the actuator and thereby adapt the pressure in the compartment in a slow control loop.by active pressure control. This low bandwidth control will reduce the maximum variations in pressures difference over the face sheet. The remaining variations will be compensated for by the fast control loops of the individual actuators, consuming only a fraction of the available driving voltage range.

In an embodiment, a closed gas system is preferred in order to have full control over the gas inside the gap. Independent of the gas to be used, the gas should be free of particles and humidity in order to prevent electrical breakdown.

A change in temperature may affect the shape of the face sheet by a shape change of the substrate 30, that is used as a reference for the gap measurements that give the feedback for position control of face sheet 20. This can be minimized by making the substrate from a material with a high ratio of the heat conductance and the thermal expansion coefficient. In this way the sensitivity to bending due to temperature gradients is minimized. One of the materials may be SiC, possibly with an additional insulating material to electrically insulate the actuator electrodes from each other. In another embodiment AlN can be a substrate material, particular since a thermal expansion coefficient can have a good match with the membrane.

Another effect may be the pre-tension in the membrane that may change as function of the difference in thermal expansion between the membrane and the support frame. Pre-tension has an effect on the maximum attainable inter-actuator stroke. This effect will be minimized by matching the two thermal expansion coefficients (membrane and support frame) as much as possible. The effect in the changes will be compensated for by the control loop. Also a change in the direction of the gravity vector that will result in a piston movement of the face sheet may be compensated for by controller 80 and or 90.

Figure 2:
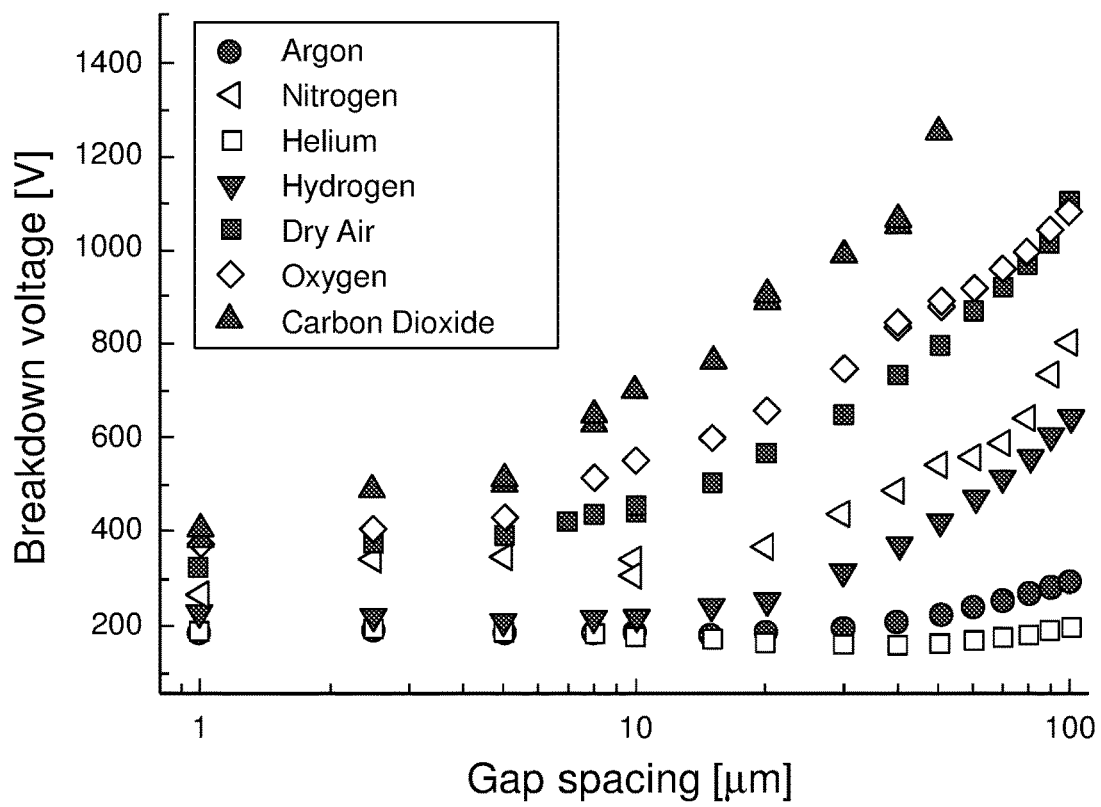
FIG. 2 schematically shows operating voltages for the reflective structure for a variety of gases.

The force of an electrostatic actuator can in general be increased by either increasing the voltage across the gap, or decreasing the size of the gap. In both situations the field strength (V/m) will increase and with that the risk on electrical breakdown. The breakdown in small gaps is described by the so called "modified Paschen curve" as given in FIG. 2 (from Acta Physica Slovaca vol. 63 No. 3, 105-205 June 2013). It is noted that the disclosed gases may be suitable for use in the adaptive optics as herein described For a nominal gap of 15 μm breakdown will occur between 200 and 600 V depending on the gas inside the gap. This can result in a maximum usable actuator pressure (at the nominal distance of 15 μm) of 8 mbar. With a gas pressure of 4 mbar this will result in an effective pressure from −4 mbar (pull) to +4 mbar (push).

In an embodiment a stroke of 5 μm may be achieved when 5×5 actuators are used. With a nominal pitch of 0.75 mm these actuators have an area of 14 mm2 and can produce a force of 400 Pa·14·10−6 m2=5.6 mN.

It is noted that the stroke is substantially more than a traditional adaptive optics, since the membrane tension can be substantially lower due to a fast control loop.

Figure 3:
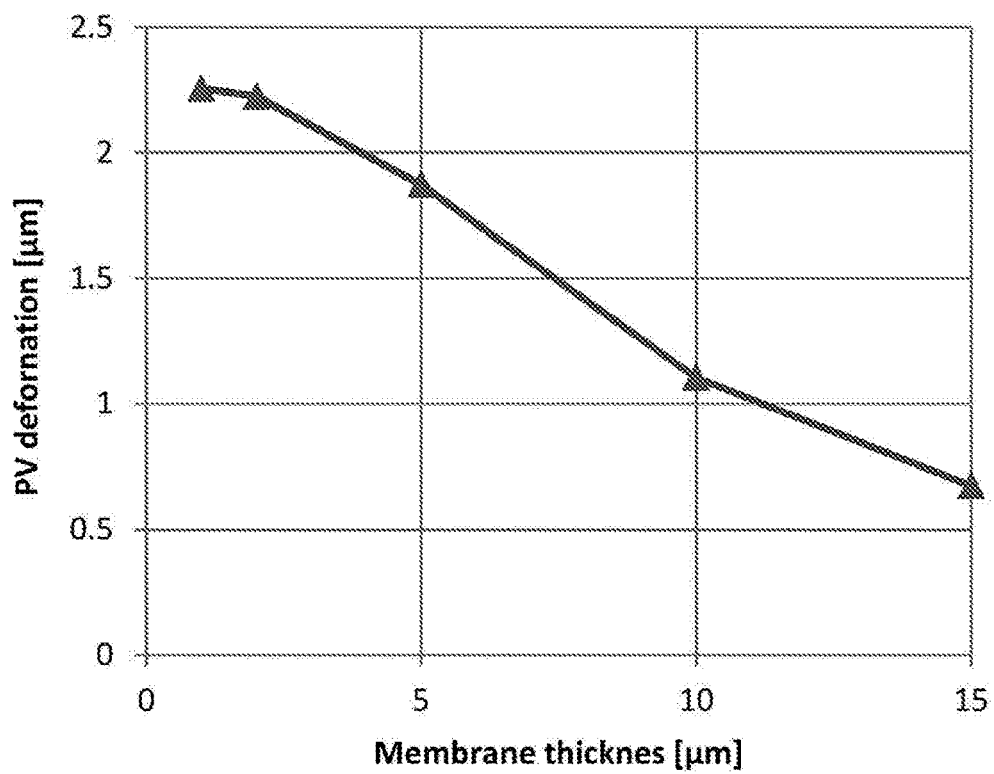
FIG. 3 illustrates peak to valley deformation of the face sheet based on FEM for varying membrane thickness.

In FIG. 3 a peak to valley deformation based on FEM simulations is shown of the face sheet when two neighbouring actuators are actuated to the maximum push and pull forces (based on +/−4 mbar). It can be seen that an inter-actuator stroke of more than 1.5 μm can be achieved for membranes up to 5 μm thick, leaving some margin for variations in the pre-tension, that was assumed to be 25 N/m.

The face sheet is by design capable of easily withstanding the nominally 4 mbar over pressure in the gap, without being blown apart. In practice with a closed volume a 4 mbar over pressure will vanish when the face sheet moves less than a micrometer outwards. So even much larger pressure differences can be handled safely, with passive means only.

The reflective structure 100 is thus particularly suitable for some types of application, such as high power lasers ($CO_2$, >40 kW) that will be applied for next generation lithography tools. This kind of power may lead to unacceptable deformation of the mirror optics, even at nearly perfect reflection. High stability and low aberration are required to accurately maintain a EUV light generation process. In another application, such as a laser guide stars, as applied in space applications the laser beam should be bright and must have high position stability. For brightness, a high power laser is required wherein optical performance degradation, e.g. due to deformations of optical elements, is unacceptable. In another application spot size, pointing and power control during material processing may be critical to quality and dictate that the performance of the optical system despite increased powers. In another application, the adaptive optics may be used in a laser cavity, to compensate for thermal effects, and optimize the laser function for mirror distance and higher spatial aberrations. Also lower power application may be used in for example astronomy telescopes or optical data transmission devices.

Figure 4:
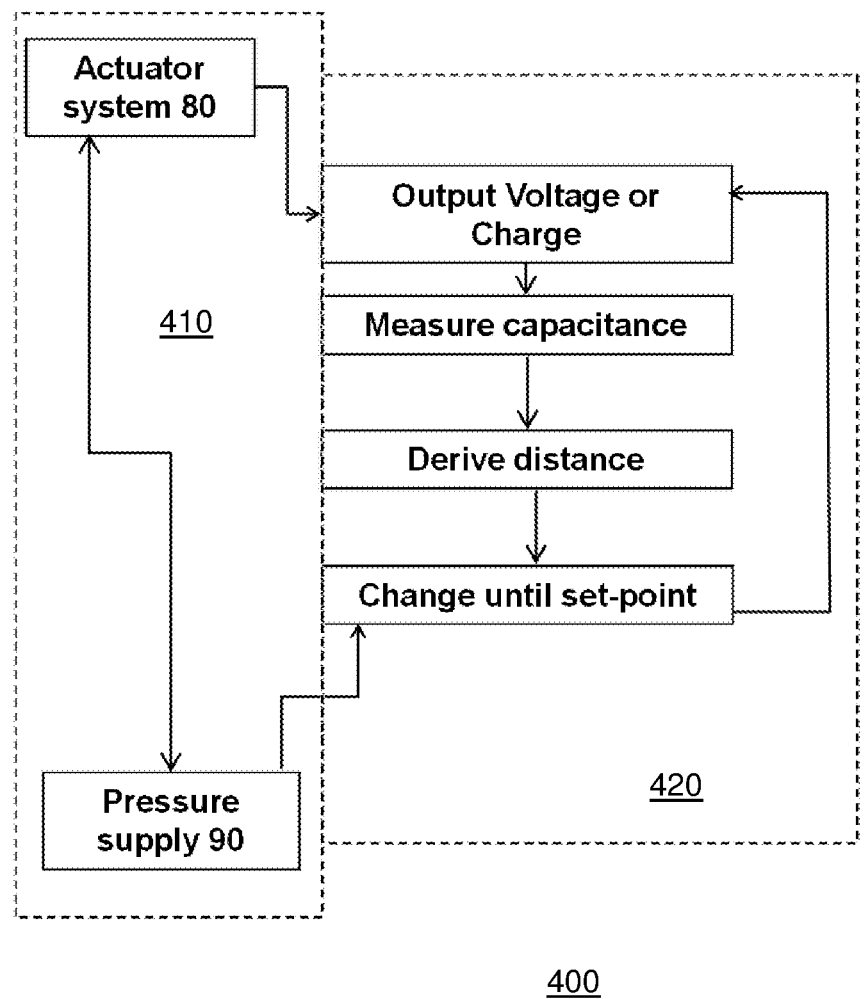
FIG. 4 illustrates an embodiment illustrating a possible algorithmic implementation of the active pressure controller.

FIG. 4 shows in more detail a possible algorithmic implementation of active pressure control for the gas in chamber 10. In an embodiment pressure supply 90 is controlled by a control circuit, communicatively linked to actuator and sensing system 80. In a first step, electrostatic actuators 801, 802 are provided with a predefined charge or voltage, and the corresponding capacitance is measured. In this way, a nominal distance of each actuator 801 802 can be derived. By comparing the outputs of the plurality of actuators 801, 802, a precise shape of the face sheet can be determined. Accordingly a control circuit 400 is connected to said electrostatic actuators, to measure a saturation value of the actuator and thereby adapt the pressure in the compartment. This saturation, i.e. driving range of actuator voltages may for example be measured by means known to the skilled person, e.g. by providing a high frequency capacitive measurement circuit, that is superposed on the driving actuator voltage. Other sensing circuits, e.g. mechanical or (electro) optical circuits may be also suitable and may be included in the actuator system 80 or being separate therefrom.

In particular, in a slow control loop 410, the pressure control is activated to in order to lower the driving control voltage.

In one of the embodiments, the control circuit is connected to said electrostatic actuators, to actively control the position of the sheet 21 based on a measured inter distances of the sheet 21 relative to the substrate 30 and an externally supplied set point. This high frequency control loop 420 compensates the instabilities in the system, due to a lack of elastic behavior of the membrane sheet. In this embodiment the elastic tension of the sheet is below 250 N/m or even below 25 N/m, which is substantially lower than the conventionally tensioned adaptive optics and therefore cannot provide equilibrium. In addition, the gas pressure counteracts in a substantially constant way, and by a suitable choice of the inter-distance of the sheet 21 respective to the substrate 30, the gas viscosity supports in a fast control loop 420 that is realistically attainable.

The actuator and sensing system 80 can be included in the reflective structure 100 or, preferably, in the adaptive optics device or optical system in which the reflective structure 100 is incorporated. It can advantageously comprise at least one microprocessor unit.

Preferably actuator electrodes 801,802 are advantageously connected with corresponding drive channels of the control and sensing device 80 e.g. by depositing electrically conductive tracks of for example gold on the corresponding surfaces.

The invention claimed is:

1. A mirror structure for adaptive optics devices, the mirror structure comprising:
   an elastically deformable layer that deforms in response to an applied force, wherein the elastically deformable layer comprises a central portion reflective to an incident light beam;
   a support substrate positioned spaced with respect to the elastically deformable layer;
   a spacer element connected to the elastically deformable layer and to the support substrate and positioned there between, wherein the spacer element is arranged to provide a separation distance between a first inner surface and a second inner surface;
   an inner chamber at least partially defined by the elastically deformable layer, the support substrate, and the spacer element, wherein the inner chamber contains a pressurized fluid;
   an actuator system capable of causing a deformation of the central portion that counteracts a pressure of the pressurized fluid;
   wherein, in use, the central portion is deformed according to profiles to control the incident light beam
   wherein the actuator system comprises one or more electrostatic actuators,
   wherein the electrostatic actuators are operatively associated with the elastically deformable layer,
   wherein the electrostatic actuators are positioned at the central portion and correspondingly associated with the support substrate,
   wherein a first actuator and a second actuator of the electrostatic actuator are adapted to respectively supply a first control voltage and a second control voltage to generate an electrostatic force field, between the elastically deformable layer and the support substrate,
   wherein the actuator system is provided with a measurement circuit connected to the electrostatic actuators, and
   wherein the measurement circuit measures sheet positions as respective inter actuator distances between the support structure and the elastically deformable layer.

2. The mirror structure according to claim 1, wherein the pressurized fluid is actively controlled by a pressure controller that is coupled to the actuator system.

3. The mirror structure according to claim 1, wherein the pressurized fluid is a thermo-conductive fluid, the mirror structure further comprising a cooling system for actively cooling the thermo-conductive fluid.

4. The mirror structure according to claim 3, wherein the cooling system comprises cooling channels provided in the support substrate.

5. The mirror structure according to claim 4, wherein the cooling channels are filled with a cooling liquid and are in connection with a heat exchanger.

6. The mirror structure according to claim 1, wherein the electrostatic actuators are provided with driving terminals and sensing terminals connected to said measurement circuit, which terminals can be combined.

7. The mirror structure according to claim 1, further comprising a sensing circuit connected to the electrostatic actuators, and
   wherein the sensing circuit prevents saturation of the actuator and thereby adapt the pressure in the inner chamber.

8. The mirror structure according to claim 1, further comprising a control circuit connected to the electrostatic actuators, and wherein the control circuit actively controls a position of the central portion based on:
   a measured inter distances of the central portion relative to the support substrate, and
   an externally supplied set point.

9. The mirror structure according to claim 1, wherein a fluid flow damping structure is provided for at least one of the group consisting of;
   the support substrate, and
   the elastically deformable layer.

* * * * *